UNITED STATES PATENT OFFICE.

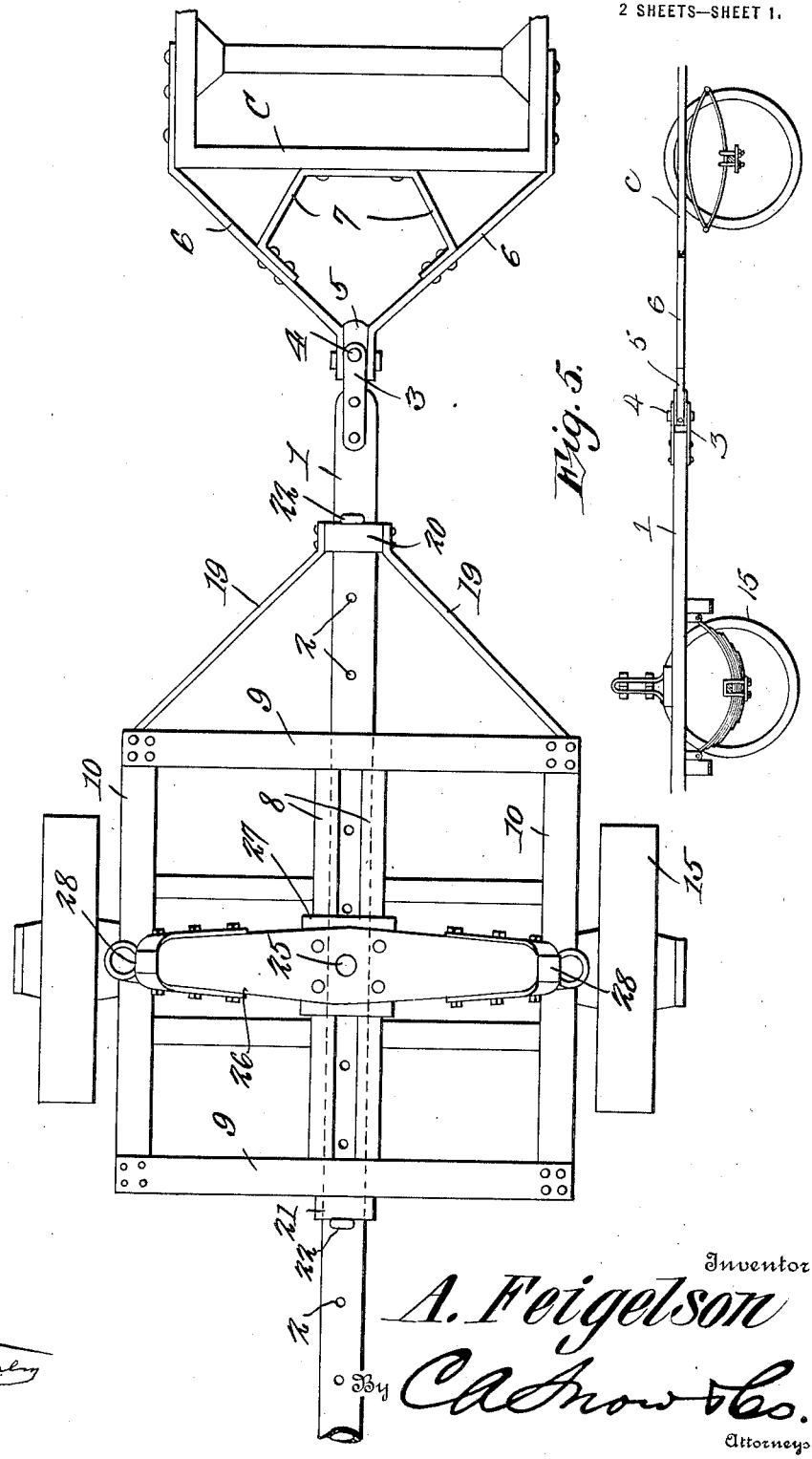

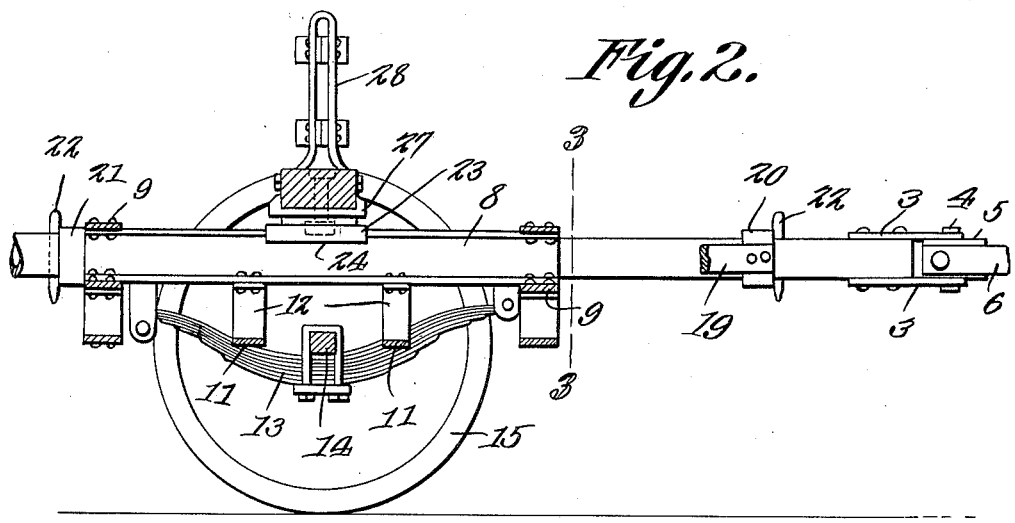
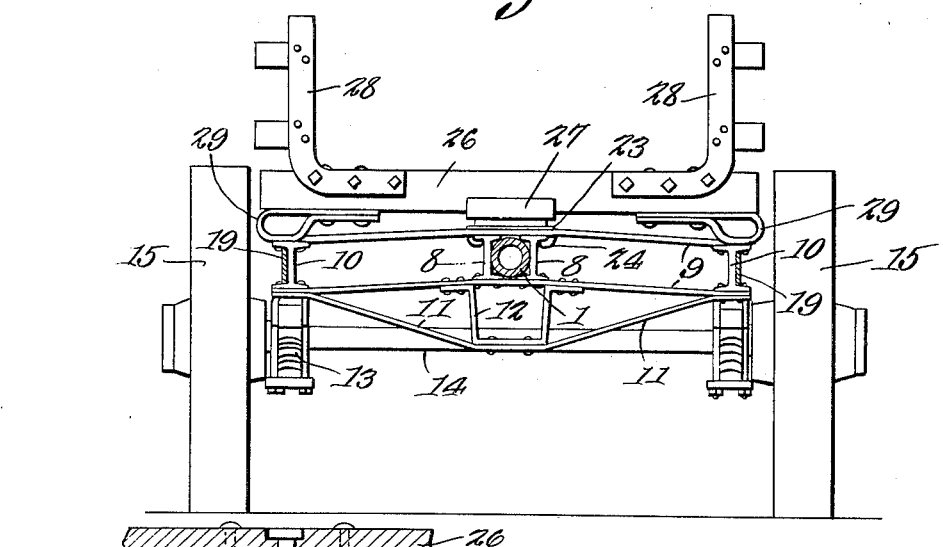

ALEXANDER FEIGELSON, OF BEAUMONT, TEXAS.

TRAILER.

1,351,102. Specification of Letters Patent. Patented Aug. 31, 1920.

Application filed August 2, 1918. Serial No. 247,992.

*To all whom it may concern:*

Be it known that I, ALEXANDER FEIGELSON, a citizen of the United States, residing at Beaumont, in the county of Jefferson and State of Texas, have invented a new and useful Trailer, of which the following is a specification.

This invention relates to trailers for use in connection with trucks, one of its objects being to provide a trailer having a coupling pole to which the bolster of the trailer is adjustably connected in a novel manner, it being possible to adjust the bolster along the pole to adapt the device to loads of different lengths.

A further object is to provide a trailer structure which is strong and compact and which has a revoluble and tiltable load engaging portion whereby the load will not become distorted by the turning of the trailer relative to the truck pulling the same.

With the foregoing and other objects in view which will appear as the description proceeds, the invention consists of certain novel details of construction and combinations of parts which will be hereinafter more fully described and claimed, it being understood that various changes may be made in the construction and arrangement of the parts without departing from the spirit or sacrificing any of the advantages of the invention as set forth in the appended claims.

In the accompanying drawings the preferred form of the invention has been shown.

In said drawings—

Figure 1 is a plan view of the trailer.

Fig. 2 is a central longitudinal section therethrough.

Fig. 3 is a section on line 3—3, Fig. 2.

Fig. 4 is a transverse section through the connection between the pole and the bolster.

Fig. 5 is a view on a reduced scale showing a side elevation of the connection between the back of the vehicle chassis and the trailer.

Referring to the figures by characters of reference, 1 designates the tubular pole of the trainer the same being provided, at intervals, with openings 2 extending downwardly therethrough. The front end of the pipe has superposed straps 3 extending therefrom which are pivotally connected, as at 4, to a block 5 held between forwardly diverging strips 6. These strips are adapted to be bolted or otherwise secured to the rear end of the chassis C of a truck and a brace strip 7 may be interposed between and secured to the chassis and the strips 6, as shown. The pole 1 fits snugly between opposed parallel I-beams 8 which are secured between superposed cross strips 9, these strips, in turn, being fastened, at their ends, to side beams 10. Truss strips 11 are secured under the strips 9 and held spaced therefrom at their centers by spacing members 12. Thus a very strong structure is provided to constitute the frame of the trailer.

Laminated springs 13 are secured to and under the side beams 10 and are secured to the end portions of an axle 14 supported by wheels 15. Forwardly converging braces 19 are secured to the front ends of the side beams 10 and are secured at their front ends to a collar 20 through which the pole 1 extends. A spacing collar 21 may be mounted on the pole 1 back of the beams 8 and by inserting pins 22 into the pole 1 in front of collar 20 and back of collar 21, the pole can be held against longitudinal movement relative to the beams 8.

Slidably mounted on the beams 8 is a saddle 23 having inturned terminals extending under the top outer side flanges of the beams 8 as shown at 24, and extending upwardly from the center of the saddle is a pivot bolt 25 which passes through the center of a bolster 26. A wear plate 27 is preferably secured to the bottom of the bolster at the center thereof for frictional engagement with the saddle 23. Side standards 28 are secured to the ends of the bolster for retaining a load thereon and wear shoes 29 are secured to the bottom of the ends of the bolster and normally close to side beams 10. Should the bolster tilt relative to the saddle 23 one or the other of the shoes 29 will come against the adjacent side beam 10 and limit such tilting movement.

When a load is mounted on the trailer and truck the trailer will follow in the track of the truck and will turn without disturbing the load because any necessary relative movement of the bolster and truss will be allowed by the pivotally and tiltably mounted bolster on a slidable saddle.

The trailer can obviously be adjusted along the pole 1 to accommodate loads of different lengths.

It will be noted by referring to Fig. 5 that when the trailer is attached to the vehicle it forms a structure having front and rear wheels and with the rigid coupling members fixed to the respective frames, said members being of equal length and connected by a flexible joint so as to cause the wheel to track in turning.

What is claimed is:—

1. A structure of the character described including a wheel supported frame, a pole carried thereby, said pole and frame being capable of relative longitudinal adjustment, a member slidable longitudinally on said frame, and a bolster pivotally connected to the slidable member.

2. A structure of the character described including a wheel supported frame having parallel flanged beams spaced apart, a pole between said beams, means adjustably engaging the pole for holding the beams and pole against relative longitudinal movement, the flanges of the beams extending over and under the pole.

3. A trailer including a pole, a wheel supported frame including connected side and intermediate beams, said intermediate beams being spaced apart and having flanges extending over and under the pole, said pole being adjustable longitudinally between the intermediate beams, and a bolster slidably and pivotally connected to the intermediate beams.

4. A trailer including spaced flanged beams, side beams, trussed connections between the beams forming a frame, a wheel supported axle on which the frame is mounted, a pole adjustable longitudinally between and lapped by the flanges of the flanged beams, and a bolster pivotally and slidably mounted on the flanged beams.

5. A vehicle including the combination with a truck of a trailer, said trailer embodying a frame and carrier wheels whereon the frame is mounted, a coupling pole carried by the trailer and capable of adjustment relative thereto, the front end of said coupling pole being connected to the truck by means of a hinged coupling, a bolster, and a member slidably mounted on the frame of the trailer to which the bolster is pivoted.

6. A structure of the character described including a wheel supported frame having spaced flanged beams, a pole between the beams, said pole and beams being capable of relative longitudinal adjustment, the flanges of the beams lapping the pole, and a bolster pivotally and slidably mounted on the flanged beams.

7. A device of the character described including front and rear wheels, a frame supported by each, a rigid coupling member fixed to each frame, said members being connected together by a flexible joint to cause said wheels to track in turning, a member having a slidable connection with one of said frames and a bolster pivoted to said member.

8. A vehicle including the combination with a truck, of a trailer, said trailer embodying a frame and carrier wheels whereon the frame is mounted, a pair of I beams secured to the frame of the trailer and spaced apart forming a housing, a coupling pole within said housing, rigid braces secured to the front end of said frame and extending forwardly therefrom and formed into a bearing member through which the coupling pole extends, means for securing said coupling pole against movement in said bearing member, a coupling member fixed rigidly to the rear end of the truck and flexibly connected to the front end of the coupling pole and a bolster having a slidable connection with said I-beams.

9. A device of the character described including front and rear wheels, a frame supported by each, a rigid coupling member fixed to each frame, said members being of equal length and being connected by a flexible joint to cause said wheels to track in turning, a pair of I-beams secured to one of said frames, a member provided with clencher flanges which engage over the flanges of said I-beams and permit said member to move lengthwise relative to said beams, and a bolster pivoted to said member.

In testimony that I claim the foregoing as my own, I have hereto affixed my signature in the presence of two witnesses.

ALEXANDER FEIGELSON.

Witnesses:
W. C. BROWN,
JNO. C. WARD.